(12) United States Patent
Vehmas et al.

(10) Patent No.: US 7,059,155 B2
(45) Date of Patent: Jun. 13, 2006

(54) METHOD OF BENDING GLASS

(75) Inventors: Jukka Vehmas, Tampere (FI); Juha Paavola, Tampere (FI); Antti-Jussi Numminen, Tampere (FI)

(73) Assignee: Uniglass Engineering OY, Tampere (FI)

( * ) Notice: Subject to any disclaimer, the term of this patent is extended or adjusted under 35 U.S.C. 154(b) by 193 days.

(21) Appl. No.: 10/131,797

(22) Filed: Apr. 23, 2002

(65) Prior Publication Data

US 2002/0170317 A1 Nov. 21, 2002

Related U.S. Application Data

(63) Continuation of application No. PCT/FI00/00945, filed on Oct. 31, 2000.

(30) Foreign Application Priority Data

Nov. 1, 1999 (FI) .................................. 19992358

(51) Int. Cl.
- C03B 23/25 (2006.01)
- C03B 27/00 (2006.01)
- C03B 23/27 (2006.01)

(52) U.S. Cl. .............................. 65/104; 65/107; 65/163; 65/273

(58) Field of Classification Search .................. 65/102, 65/104, 107, 163, 273, 289, 290, 374.12, 65/291
See application file for complete search history.

(56) References Cited

U.S. PATENT DOCUMENTS

| | | | | | |
|---|---|---|---|---|---|
| 2,223,124 | A | * | 11/1940 | Owen | 65/35 |
| 2,859,561 | A | * | 11/1958 | Jendrisak | 65/290 |
| 3,037,324 | A | * | 6/1962 | Carson | 65/288 |
| 3,220,822 | A | * | 11/1965 | Jendrisak | 65/291 |
| 3,278,288 | A | * | 10/1966 | Leflet, Jr. | 65/104 |
| 3,374,077 | A | * | 3/1968 | Cypher | 65/104 |
| 3,582,304 | A | * | 6/1971 | Bognar | 65/105 |
| 3,600,150 | A | * | 8/1971 | Rougeux | 65/268 |
| 3,846,104 | A | * | 11/1974 | Seymour | 65/104 |
| 4,575,389 | A | * | 3/1986 | Halberschmidt et al. | 65/273 |
| 4,778,506 | A | * | 10/1988 | Petitcollin et al. | 65/106 |
| 4,778,508 | A | * | 10/1988 | Petitcollin et al. | 65/107 |
| 4,918,946 | A | | 4/1990 | Vanaschen et al. | 65/104 |
| 4,976,762 | A | | 12/1990 | Anttonen | 65/107 |
| 5,059,233 | A | * | 10/1991 | Miihkinen et al. | 65/104 |

FOREIGN PATENT DOCUMENTS

| | | |
|---|---|---|
| EP | 0261611 | 3/1988 |
| EP | 0882680 | 12/1998 |
| FI | 884443 | 4/1990 |
| FI | 931828 | 9/1994 |
| WO | 9511202 | 4/1995 |

\* cited by examiner

*Primary Examiner*—Carlos Lopez
(74) *Attorney, Agent, or Firm*—Ladas and Parry LLP

(57) ABSTRACT

A method of bending glass, in which glass (5) is heated in a bending furnace (1). After the heating, the glass (5) is transferred onto a mold (7). The glass-bending mold (7) is at at least one point arranged to be bent substantially in its entirety when the mold (7) is transferred from the position it had during the initial heating of the glass (5) into a position where the glass (5) is arranged upon the mold (7).

7 Claims, 1 Drawing Sheet

METHOD OF BENDING GLASS

"This application is a continuation of copending International Application PCT/FI00/00945 filed on 31, Oct. 2000, which designated the U.S., claims the benefit thereof and incorporates the same by reference."

The invention relates to a method of bending glass, in which method glass is heated in a bending furnace and transferred onto a mould, whereby the mould is transferred from the position it had during the initial heating of the glass into a position where the glass is arranged upon the mould.

Further, the invention relates to a glass-bending mould, onto which the heated glass is arranged to be transferred for bending, whereby the mould is arranged to be transferred from the position it had during the initial heating of the glass into a position where the glass is arranged upon the mould.

Basically, two kinds of solutions have been suggested for bending glass, i.e. the glass is bent either inside or outside a bending furnace. Bending glass outside a bending furnace is disclosed in WO publication 95/11202 and FI publications 891646 and 863826, for example. Glass is typically heated in conventional roller furnaces. The actual bending takes place outside the furnace, usually either gravitationally or by pressing the glass against a desired form surface. When the glass is bent outside the furnace, the problem is that the glass cools during the bending. The surfaces of the glass naturally cool faster than the inside of the glass. Thus, the problem is that the bending resistance of the glass increases greatly, and in addition, the temperature of the glass will fall below the tempering temperature if the glass is taken out of the furnace only slightly warmer than the tempering temperature. Bending outside the furnace always requires additional heating of the glass into a temperature exceeding the normal tempering temperature. Overheating of the glass always leads to great quality problems in the glass, and thus a high quality level cannot be achieved for the glass. Further, as to the bending form, it is very difficult to produce flawless glass.

If glass is bent inside the furnace, a great deal of know-how is required when the glass to be heated is transferred to the bending mould. For instance, difficulties are caused by the fact that the transfer has to take place in a hot state, i.e. the temperature of the furnace has to be approximately 700° C., for example. For example the positioning of the glass into the correct location is difficult in a hot state. Moreover, the upper surface of the glass may in some cases be coated or painted, and thus prone to damage. Further, due to its temperature, the glass is soft, and touching easily leaves traces on it. However, what it comes to optical quality, bending glass inside the furnace allows best possible glass to be produced.

In a method in which the heating and bending of the glass are performed inside the furnace, the glass is heated upon ceramic rollers. After this, the glass is lifted up from the ceramic roller arrangement by means of a vacuum lifter, transferred from the vicinity of the rollers and dropped onto an edge mould brought under the vacuum lifter. The glass is then immediately transferred to temper cooling. Hereby, however, the central area of the glass easily bends too much, in other words an 'overbend' is formed in the glass, which may even be desirable in the manufacture of vehicular glasses. However, the method is hereby not applicable to the manufacture of furniture glasses. Further, vacuum lifters leave marks on the upper surface of the glass to be bent, in particular in the treatment of coated and painted glasses.

FI publications 884443 and 931828 disclose a solution in which the glass is positioned directly upon a bending mould, whereby the glass is heated as from the initial situation in such a way that it is supported by the mould. The large number of moulds and the consequently impaired repeatability accuracy are drawbacks of this solution. Further, the manufacture of the mould itself is a problem, because it is very difficult to produce an optimal mould when the glass is supported by the mould during the entire heating and temper cooling process. Also in this method, the central area of the glass bends too much, in other words an overbend is formed in the glass.

Furthermore, a method is known which utilizes a roll arrangement which bends according to the form of the glass inside the furnace. From the roll arrangement the glass is correspondingly transferred to the roll arrangement of the cooling unit. The method is very complex and expensive, and in addition, the range of potential forms for the glasses to be manufactured is rather limited.

An object of this invention is to provide a method of bending glass, and a glass-bending mould, the utilization of which allows production of bent glass of high quality in a reasonably simple way.

The method according to the invention is characterized by bending the mould substantially in its entirety at at least one point when the mould is transferred from the position it had during the initial heating of the glass into a position where the glass is arranged upon the mould.

Further, the apparatus according to the invention is characterized in that the mould is at at least one point bendable substantially in its entirety when the mould is transferred from the position it had during the initial heating of the glass into a position where the glass is arranged upon the mould.

An essential idea of the invention is that glass is heated in a furnace and transferred onto a mould. The mould is transferred from the position it had during the initial heating of the glass into a position where the glass is arranged upon the mould. The mould is at at least one point bent substantially in its entirety when it is transferred from the position it had during the initial heating of the glass into a position where the glass is arranged upon the mould. The idea of a preferred embodiment of the invention is that the bending mould is arranged in the furnace, and the glass is bent in the bending furnace. The idea of a second preferred embodiment is that the bending mould comprises at least two mould parts connected to each other with pivots. The idea of a third preferred embodiment is that the mould is bent in such a way that at at least some stage of the transfer of the glass onto the mould, the front part of the mould is upon the end part. The idea of a fourth preferred embodiment is that the bending mould is arranged upon guides. The idea of a fifth preferred embodiment is that the glass is transferred onto the mould in such a way that while the glass is being transferred, the mould moves in such a way that at least the horizontal velocity of the front edge of the mould is substantially as high as the horizontal velocity of the glass.

An advantage of the invention is that the glass can be transferred onto the mould in a highly flexible manner. Further, the glass does not have to be unsupported long distances when it is transferred onto the mould. Further still, the mould may be formed such that it does not require unreasonably much space. If it is bent inside the furnace, the glass does not have to be heated into a temperature considerably higher than the tempering temperature. Thus, high optical quality and a flawless bending form are achieved for the glass. Moreover, over-bending of the central area of the glass, i.e. formation of an overbend, can be prevented. The transfer can be implemented in such a way that no marks are left on the upper surface of the glass. All in all, the solution is reasonably simple and reliable.

The invention is explained in more detail in the attached drawings, of which

Figure 1:
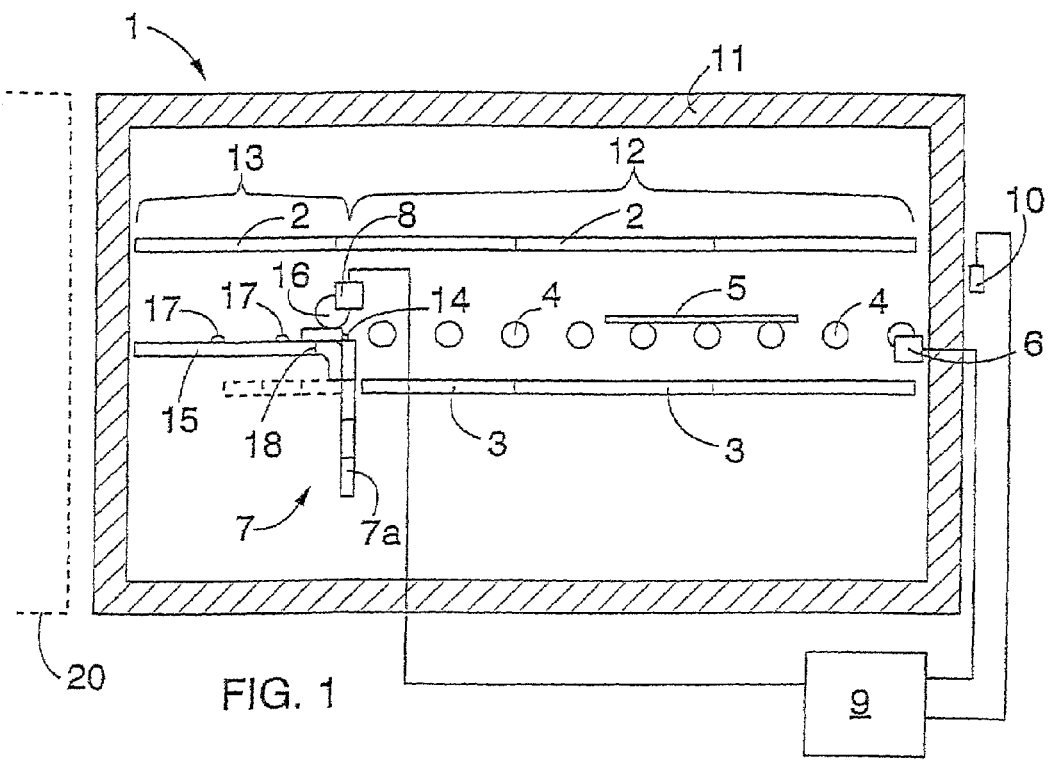
FIG. 1 shows a schematic side view of a cross-section of an apparatus according to the invention.

FIG. 1 illustrates a bending furnace 1. The bending furnace 1 comprises means, for example upper resistors 2, for heating glass 5 in the furnace from above, and means, for example lower resistors 3, for heating the glass 5 in the furnace from below. While in the bending furnace 1, the glass 5 is supported by rollers 4, for example ceramic rollers. Roller drive 6 shown schematically can be arranged as desired in such a manner that the bending furnace is for example oscillating, half-oscillating or continuous. The bending furnace 1 further comprises a mould 7, wherebythe heated glass 5 is led from the rollers 4 onto the mould 7, so that the glass 5 bends upon the mould 7.

The mould 7 is made movable in such a way that its movement is controlled by mould drive 8. The mould drive may be chain drive or gear drive, for example, or it can be implemented by utilizing a robot outside the furnace. The roller drive 6 and the mould drive 8 are controlled by a control unit 9. Thus, both the roller drive 6 and the mould drive 8 can be implemented in any manner known by a person skilled in the art, and by means of the control unit 9, the roller drive 6 and the mould drive 8 can be controlled in such a way that desired and sufficiently accurate movement is achieved for the glass 5 and the mould 7. The apparatus further comprises a sensor 10, which allows determination of the position of the glass 5 fed into the bending furnace 1 from the right side in FIG. 1. On the basis of the information contained in the sensor 10 and the roller drive 6, the control unit 9 detects at each particular moment in which part of the furnace the glass 5 is located. Furthermore, the roller drive 6 is implemented in such a way that the movements can be implemented accurately and steplessly.

FIG. 1 schematically illustrates frame 11 of the bending furnace 1 without showing openings through which the glass 5 is led into the bending furnace 1 or, on the other hand, openings through which the glass 5 is led out of the bending furnace 1, for instance. The frame 11 has very good insulators, so that the heat inside the bending furnace 1 does not escape out of the furnace. Further, FIG. 1 does not show a conveyor positioned on the right side of the bending furnace 1, by means of which the glass 5 is brought into the bending furnace. Part of a tempering unit 20 on the left side of the bending furnace 1 is indicated by broken lines in FIG. 1. The basic structure of the bending furnace 1 and the basic solutions related to the bending furnace 1 are as such fully known by those skilled in the art and are therefore not described in greater detail herein.

The glass 5 is brought into the furnace in such a way that first the glass 5 is brought into a heating section 12. The heating section 12 comprises upper resistors 2 above the rollers 4 and lower resistors 3 below the rollers 4, whereby the glass 5 is heated in the heating section 12 both from above and from below. As soon as the glass 5 has been heated sufficiently warm, it is transferred to a bending section 13. Upper resistors 2 are arranged over the whole area of the bending section 13. By contrast, the bending section 13 has no lower resistors 3 in the embodiment shown in FIG. 1. If desired, lower resistors 3 or other means, such as blowing means, may be arranged in the bending section 13 for heating the glass 5 from below.

The mould 7 is at at least one point bendable substantially in its entirety when the mould 7 is transferred from the position it had during the initial heating of the glass 5 into a position where the glass 5 is arranged upon the mould 7. The mould 7 being bendable substantially in its entirety means that it is not sufficient that only the surface of the mould 7, for example, changes its form. The bending line of the mould 7 is substantially perpendicular to the direction of movement of the glass 5. The mould 7 is formed for instance by several pieces, i.e. mould parts 7a, connected to each other by joints or pivots 14, whereby the surface of the mould 7 supporting the glass is led in a chain-track-like manner to support the glass 5. Since the mould 7 is bendable, there may be upper resistors 2 above all rollers 4 and lower resistors 3 below all rollers 4. Thus, the bending section 13 provided only with upper resistors 2, may be set up in the bending furnace 1, in the section after the rollers 4, whereby the part of the bending furnace provided with rollers 4 can in its entirety function as the heating section 12.

Figure 2A:
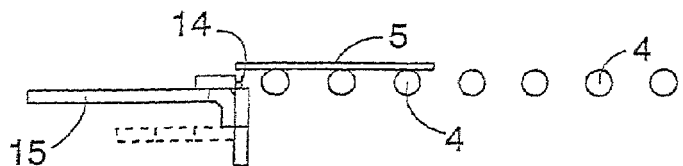
FIGS. 2a, 2b and 2c show a schematic side view of transfer of glass from rollers onto a mould, using the apparatus according to FIG. 1.
Figure 2B:
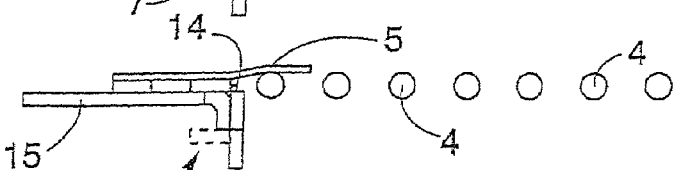
Figure 2C:
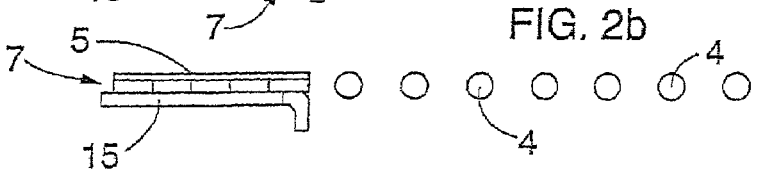

The front part of the mould 7 may be arranged to receive the front edge of the glass 5 as shown in FIG. 2a. Hence, the mould 7 is first mainly in an upright position. On the other hand, the first part 7a of the mould, the length of which is about 250 mm, may be arranged approximately 25 mm below the upper level of the rollers 4, and the rest of the mould 7 may be arranged in such a way that it is bent downwards from the first pivotal point 14. When the first part 7a of the mould 7, or at least the front edge of the mould 7 is arranged slightly below the upper level of the rollers 4, the glass 5 may bend slightly downwards after the last roller 4 prior to contacting the front edge of the mould 7. The mould 7 can also be bent in the way indicated by broken lines in FIGS. 1, 2a and 2b, i.e. in such a way that in a situation illustrated in FIG. 2b, for example, the end part of the mould 7 is below the front part. Hence, the mould 7 does not increase the height of the furnace 1. The glass 5 is moved forwards slowly and smoothly, and when the front edge of the glass 5 reaches the front edge of the mould 7, the mould 7 begins to move forwards at exactly the same speed as the glass 5. The mould 7 being bent, the distance at which the glass 5 is unsupported between the last roller 4 and the front part of the mould 7 can be arranged very short. While the glass 5 and the mould 7 move forwards, the next pivoted part 7a of the mould always rises to the level of the preceding part 7a of the mould, as shown in FIG. 2b. The mould 7 and the glass 5 continue their movement forwards, and the rest of the pivoted parts 7a of the mould also rise substantially to the level of the upper surface of the rollers 4, until the rear edge of the glass 5 travels over the last roller 4 and the rear part of the glass also falls onto the mould 7, as shown in FIG. 2c. After this, the glass 5 is allowed to bend against the mould 7 in the bending furnace 1, and the glass 5 is transferred to tempering upon the mould 7. Hence, when the glass 5 is being transferred onto the mould 7, the front edge of the mould 7 and the glass 5 move substantially horizontally, substantially at the same speed. In other words, the movements and the speed of the movements of the glass 5 and those of the mould 7 are synchronized.

The mould 7 is arranged to move upon a guide 15. The mould 7 can be moved upon the guide 15 for example by means of a gear 16 positioned above the mould 7. For example small wheels 17, which rotate freely, may be arranged above the guide 15. On the other hand, there may also be a smooth sliding surface between the mould 7 and the guide 15, whereby the mould 7 easily glides upon the guide 15. The guide 15 may also be provided with a disconnecting point 18, whereby the horizontal part of the guide 15 can be pulled out from the outside of the bending furnace 1, and the mould 7 and the glass 5 upon it can be pulled to temper cooling upon the horizontal part of the guide 15. The guide 15 is so rigid that when the pivoted mould 7 is supported upon the guide 15, the surface of the mould 7 contacting the glass 5 is also straight.

Figure 3:
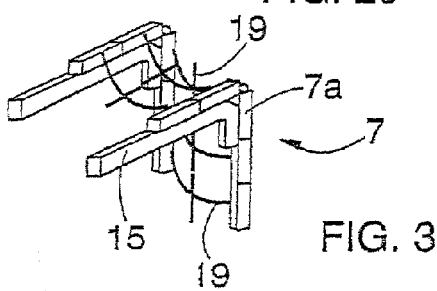
FIG. 3 shows a schematic perspective view of a mould used in the apparatus of FIG. 1.

The mould 7 used may be what is known as an edge mould, contacting the glass 5 only at the edge parts, whereby the bending of the central area of the glass 5 is controlled by a precise heating profile connected with a precise bending time. Control of a precise heating profile and a precise bending time prevents excessive bending of the central area of the glass, in other words formation of an overbend. The mould 7 may also have a partial supporting surface, whereby also the central area of the glass 5 is provided with central supports 19 supporting the glass 5, as shown in FIG. 3. By means of the central supports 19 formation of an overbend can be prevented very efficiently. The pivots 14 are required for the edge parts only, whereby the central supports 19 may be separate pieces. Otherwise, the structure of the central supports 19 may be similar to the structure of the edge part. Hereby, however, the mould structure is according to the final form of the glass also at the central area of the glass 5.

The mould 7 does not have to be formed of parts connected to each other by pivots, but the longitudinal parts of the edge parts and also the longitudinal parts of the central supports 19 may be formed of one part in such a way that they are bendable and allow thus bending of the mould 7. The longitudinal parts may be for example a fibrous rope, such as a cord made of corrosion-resisting steel fibre. At the central supports 19, the longitudinal cord may be loose when the mould is bent, whereby the straightening of the mould 7 tightens the cords rigid, so that being tightened, the cords support the glass 5. Thus, no actual coating needs to be attached between the glass 5 and the mould 7, but the cord itself may be such that the marks it leaves on the glass 5 are minimal and that the cord does not impair the temper cooling.

The drawings and the related description are only intended to illustrate the idea of the invention. The details of the invention may vary within the scope of the claims. Thus, the heated glass 5 may be transferred onto the mould 7 to be bent in some other way than by means of rollers 4. For example a vacuum lifter may be used for the transfer. Further, the mould 7 may be arranged outside the bending furnace 1, whereby the glass 5 is bent outside the bending furnace 1. Hereby, too, the bending takes place in a very isolated space. Most preferably, however, the bending is carried out in the bending furnace 1.

The invention claimed is:

1. A method of bending glass, comprising:
   initial heating glass,
   while a mould is being bent substantially in its entirety at least at one point, transferring the initial heated glass onto the mould such that the mould is transferred from a position it had during the initial heating of the glass into another position with the glass arranged upon the mould,
   after transferring the glass onto the mould, bending the glass upon the mould in a bending surface,
   after bending the glass, transferring the glass to temper cooling upon the mould, and then tempering the glass.

2. A method according to claim 1, comprising bending the mould in such a way that at at least some stage of the transfer, a front part of the mould is upon an end part of the mould.

3. A method according to claim 1, wherein while the glass is transferred onto the mould, the mould is moved in such a way that at least the horizontal velocity of the front edge of the mould is arranged substantially as high as the horizontal velocity of the glass.

4. A method according to claim 1, wherein the initial heating of the glass is upon rollers.

5. A method according to claim 4, comprising transferring the glass onto the mould by means of the rollers.

6. A method according to claim 4, comprising arranging the front edge of the mould slightly below the upper level of the rollers.

7. A method according to claim 1, comprising bending the mould in such a way that a bending line of the mould is substantially perpendicular to a direction of movement of the glass.

* * * * *